UNITED STATES PATENT OFFICE.

BRUNO BRUHN, OF HAMBURG, GERMANY, ASSIGNOR TO HENRY EDMUNDS, OF LONDON, ENGLAND

PROCESS FOR THE TREATMENT OF BLAST-FURNACE SLAGS AND OTHER SILICATE MIXTURES FOR THE PRODUCTION OF CEMENTITIOUS MATERIAL THEREFROM.

No. 859,166.  Specification of Letters Patent.  Patented July 2, 1907.

Application filed April 17, 1905. Serial No. 256,116.

*To all whom it may concern:*

Be it known that I, BRUNO BRUHN, a subject of the German Emperor, residing at Hamburg, Germany, have invented a certain new and useful Process for the Treatment of Blast-Furnace Slags and other Silicate Mixtures for the Production of Cementitious Material Therefrom, of which the following is a specification.

It is recognized that cementitious silicate mixtures possess quicker and stronger setting properties the more basic they are in character. The technical literature on this subject shows a series of experiments and processes involving the addition of basic material, such as lime and other alkaline earth to molten blast furnace slag or other silicate mixtures in order to obtain a product similar analytically to Portland cement; besides increasing the quantity of lime a process has also been described for adding such other alkalies as were considered necessary.

The present invention differs from the above processes in the fact that a small quantity, such as a few percent, of alkali or alkaline salts are added to the molten silicate mixtures after they have been melted as an easy method of securing the hydraulic setting properties without the addition of other ingredients, such as lime, and so forth. This process is especially adapted for producing cementitious material from blast furnace slag in connection with air granulating processes.

Blast furnace and similar slags melted at high temperatures usually contain only very small quantities of alkalies on account of their volatility. In the case of water granulated slags the addition of alkalies is of little advantage, since they are easily dissolved and carried away because of their solubility in water, but when the slag is cooled quickly in a dry or semi-dry condition, such dissolving or removal can not take place. The chemical effect of the addition of alkaline material to cold water granulated slag is also different from such addition made when slag is at such a temperature that the alkalies or alkaline earths are entirely or partially dissolved with or without chemical reaction or decomposition. The greater intensity of action in the latter case may possibly be explained on different theories. In the first place, the chemical transformation due to the formation of silicates with quick setting properties, such as alkaline silicates, is probably important and also, in the second place, the alkaline reaction of the water added produces quick setting properties. If merely a solution of the alkaline additions takes place in the silicate mixtures the finer distribution through such mixtures perhaps causes a more powerful effect of the alkaline addition acting as a catalytic agent. An exact explanation is not possible on account of the complicated conditions attending the reciprocal action of the various chemical components and the insufficient knowledge thereof. The carrying out of this invention in practice varies with different conditions. In most cases the addition can preferably be made in a mixer provided with a suitable stirring device into which the slags are poured before they are subjected to further treatment for the purpose of oxidation granulation and cooling in any of the various well known processes.

Without being limited to the details of the disclosure in this case, what is claimed as new and what is desired to be secured by Letters Patent is set forth in the appended claims.

1. The process for the treatment of blast furnace slag which consists in adding and incorporating a few percent of alkaline salts in molten furnace slag and in oxidizing, granulating and cooling the mixture so as to produce highly cementitious material therefrom without the addition of other ingredients.

2. The process for the treatment of blast furnace slag which consists in adding and incorporating a few percent of alkaline salts with molten furnace slag material and in granulating and cooling the mixture in the presence of oxygen bearing fluid so as to form highly cementitious material therefrom without the addition of other ingredients.

3. The process for the treatment of blast furnace slag which consists in adding and incorporating with molten furnace slag alkaline salts to the extent of not more than a few percent and in treating and cooling the mixture so as to form highly cementitious material therefrom containing considerably less lime than Portland cement without the necessity of adding other ingredients.

4. The process for the treatment of blast furnace slag which consists in adding and incorporating with highly heated slag material alkaline salts to the extent of not more than a few percent and in granulating and cooling the mixture in the presence of oxygen bearing fluid so as to produce cementitious material therefrom.

5. The process for the treatment of furnace slag which consists in adding and incorporating a few percent of alkaline salts with highly heated furnace slag material and in granulating and cooling the mixture so as to produce highly cementitious material therefrom containing considerably less lime than Portland cement without the necessity of adding other ingredients.

6. The process for the treatment of furnace slag which consists in adding and incorporating a few percent of alkaline salts with highly heated furnace slag material and in treating and cooling the mixture so as to produce highly cementitious material therefrom containing considerably less lime than Portland cement.

7. The process for the treatment of silicate material which consists in adding and incorporating with highly heated silicate material alkaline salts to the extent of not more than a few percent and in cooling the same so as to produce cementitious material therefrom, containing considerably less lime than Portland cement.

In testimony whereof, I have signed my name to this specification in the presence of two subscribing witnesses.

BRUNO BRUHN.

Witnesses:
ERNEST H. L. MUMMENHOFF,
IDA CHRIST. HAFERMANN.